United States Patent
Nielsen et al.

(10) Patent No.: US 6,641,475 B1
(45) Date of Patent: Nov. 4, 2003

(54) SYSTEM FOR DISINFECTION AND METHOD

(75) Inventors: Bjarne Nielsen, Aalborg (DK); Knud Krogh Andersen, Adybro (DK)

(73) Assignee: SFK-Danfotech A/S, Aalborg (DK)

( * ) Notice: Subject to any disclaimer, the term of this patent is extended or adjusted under 35 U.S.C. 154(b) by 0 days.

(21) Appl. No.: 09/787,849

(22) PCT Filed: Sep. 21, 1999

(86) PCT No.: PCT/DK99/00499

§ 371 (c)(1),
(2), (4) Date: Apr. 9, 2001

(87) PCT Pub. No.: WO00/18243

PCT Pub. Date: Apr. 6, 2000

(30) Foreign Application Priority Data

Sep. 25, 1998 (DK) .......................... 1998 01219
Feb. 8, 1999 (DK) .......................... 1999 00165

(51) Int. Cl.[7] .............................................. A22C 21/06
(52) U.S. Cl. ................................... 452/122; 452/109
(58) Field of Search ........................ 452/71, 122, 120, 452/109, 152, 173, 123, 165; 30/123.1

(56) References Cited

U.S. PATENT DOCUMENTS

| | | | | | |
|---|---|---|---|---|---|
| 2,427,840 | A | * | 9/1947 | Davis | 452/116 |
| 3,921,255 | A | * | 11/1975 | LaBarber | 452/109 |
| 4,876,767 | A | * | 10/1989 | Harben, III et al. | 452/106 |
| 4,884,341 | A | * | 12/1989 | Baertlien | 30/123.3 |
| 4,899,421 | A | * | 2/1990 | Van Der Eerden | 452/116 |
| 5,112,272 | A | * | 5/1992 | Andersen | 452/122 |
| 5,167,568 | A | * | 12/1992 | Esbroeck et al. | 452/116 |
| 5,181,878 | A | * | 1/1993 | Bekkers | 452/109 |
| 5,199,922 | A | * | 4/1993 | Korenberg et al. | 452/122 |
| 5,419,738 | A | * | 5/1995 | Lysbo et al. | 452/122 |
| 5,503,594 | A | * | 4/1996 | Karubian et al. | 452/173 |
| 5,607,349 | A | * | 3/1997 | Karubian et al. | 452/173 |
| 5,611,088 | A | * | 3/1997 | Almon | 4/222 |
| 5,688,164 | A | * | 11/1997 | Mills et al. | 452/122 |

FOREIGN PATENT DOCUMENTS

| | | |
|---|---|---|
| DK | 174160 | 7/2002 |
| EP | 0181046 A1 * | 5/1986 |
| EP | 0 457 408 A1 | 11/1991 |
| EP | 0564613 B1 * | 10/1993 |
| WO | WO 92/13458 | 8/1992 |

* cited by examiner

*Primary Examiner*—Peter M. Poon
*Assistant Examiner*—David Parsley
(74) *Attorney, Agent, or Firm*—William J. Sapone; Coleman Sudol Sapone, P.C.

(57) ABSTRACT

An apparatus for the processing/handling of the anus/rectum of slaughtered animals, comprising a cutting arrangement mounted in a housing for the cutting-over of the connection between the anus/rectum and surrounding tissue, the cutting arrangement comprising a cavity defined by a cylindrical blade with cutting edge and an extension. Displaced in the cavity, substantially parallel with the axis of the cylindrical blade, there is a mandrel/hollow profile connected to a source of a second under-pressure on the inside of the mandrel/hollow profile and for emptying of a part of the intestine/rectum. A pump is provided for handling/removal/sucking-out of a disinfection substance supplied to the cavity, the pump being separated from the source of the second under-pressure and comprising an arrangement for establishing a first under-pressure in the cavity. It is possible to cut free the anus/rectum area at the same time that an emptying of the outermost part of the intestine is effected without incurring any contamination of the meat with colon bacteria from feces.

5 Claims, 4 Drawing Sheets

SYSTEM FOR DISINFECTION AND METHOD

RELATED APPLICATION

Figure 1:
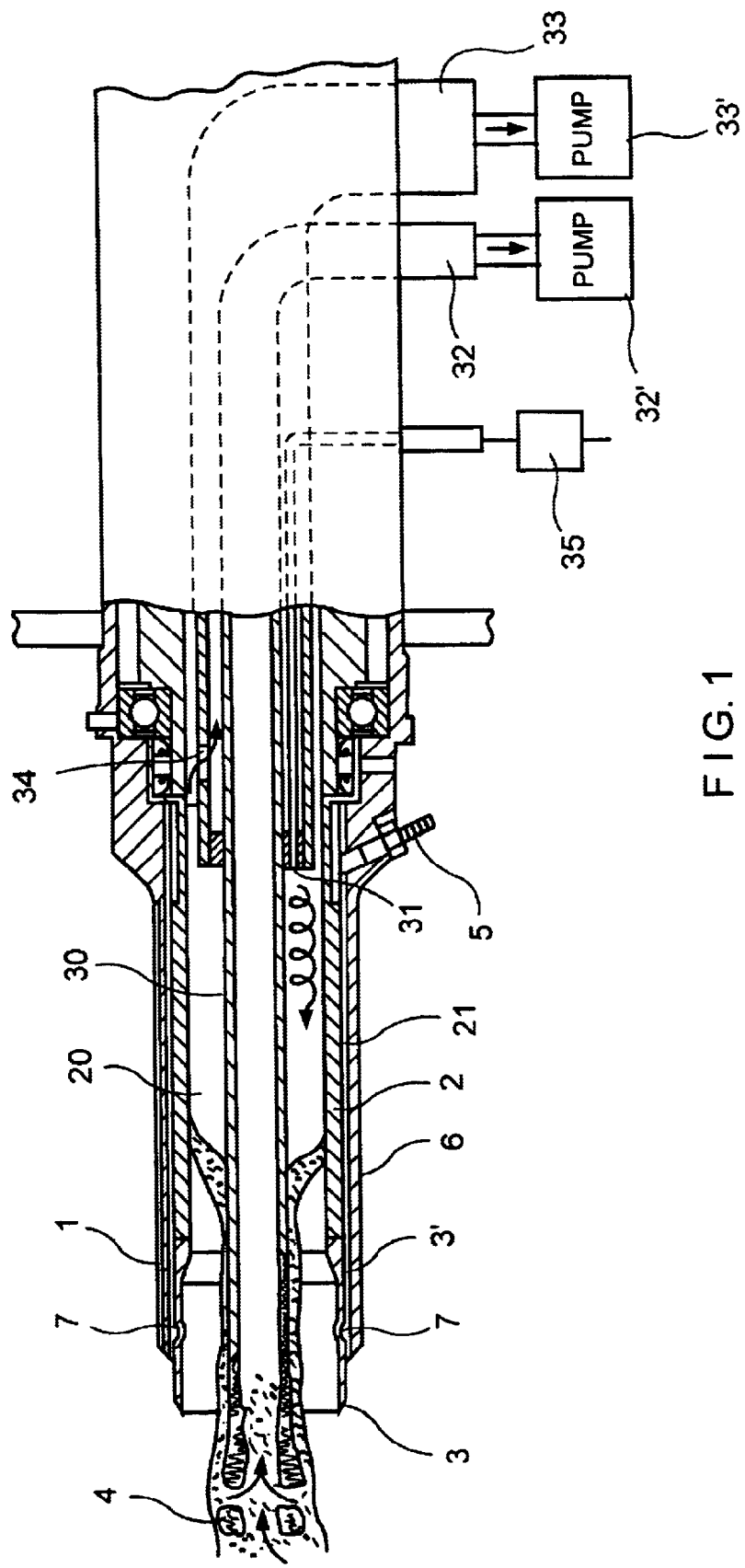

This application is the national filing of international application number PCT/DK99/00499.

The invention concerns an apparatus for the processing/handling of the anus/rectum of slaughtered animals, comprising a cutting arrangement mounted on a housing for the cutting-over of the connection between the anus/rectum and surrounding tissue, said cutting arrangement comprising a cavity defined by a cylindrical blade with cutting edge and an extension of same, and further movement means for the handling of the cutting arrangement, and where displaced in the cavity, substantially parallel with the axis of the cylindrical blade, there is a mandrel/a hollow profile connected to means for establishing of a second under-pressure on the inside of the mandrel/hollow profile and for the emptying of a part of the intestine/rectum.

The invention also concerns a method for the loosening of the anus/rectum of a slaughtered animal, comprising the cutting free of the outermost part of the anus/rectum in relation to the surrounding tissue by means of a cutting arrangement, and where in a mandrel or the like there is established an under-pressure for the sucking-up of faeces and the like from the anus/rectum, said mandrel being moved down into the anus/rectum, and that a knife/drill is fed forward for the cutting free.

Finally, the invention concerns the use of such an apparatus and the method.

From EP-B-564613 there is known an apparatus for the loosening of the anus of slaughtered animals, this comprising a cutting arrangement and means for positioning the slaughtered animal in relation to the cutting arrangement.

In this case the cutting arrangement is configured as a cylinder which is moved forward, and which with its cutting edge at the free end effects a loosening of the anus/rectum. However, in connection with this loosening there will occur a strong contamination of the meat due to the contents of colon bacteria in the intestines, which will thus spread out to the surrounding meat.

It is known from other systems to effect an emptying of a part of the intestines, corresponding to the outermost 10–20 cm, by applying a vacuum or an under-pressure to the outermost part of the intestine area. The faeces are hereby sucked out. As a consequence of the under-pressure, the intestine will collapse, which means that not all of the intestine is emptied. There is thus effected an emptying of the faeces from the outermost area, while at the same time a reasonable and effective closing-off of the actual intestine itself takes place. However, also here there occurs a contamination of the meat due to the free-cutting which takes place.

From EP-A457408 there is known an apparatus for the cutting free of the anus, and where a disinfection is carried out in the area in which the cutting is effected. However, the apparatus is arranged in such a manner that the liquid disinfectant is injected on the inner side of a mandrel for the sucking-out of the faeces, and is thus mixed with the faeces, and this mixed-together substance of faeces and liquid disinfectant is subsequently sucked out through the same opening. Consequently, no disinfection of the sides of the blade is carried out, which means that a contamination of the meat may very well take place, in that the sides of the cutting edge are in no way subjected to disinfection. Moreover, the mixing of faeces together with the disinfection liquid means that the liquid cannot be reused, but must be directly discarded as waste.

There is also known an apparatus from U.S. Pat. No. 4,884,341 for the loosening of intestines by means of a cutting and rotating knife, and where water is applied in connection with the cutting-free, indeed on the inner side of the rotating blade in the same way as with the present invention, but where the sucking-out of both water and faeces take place in one and the same chamber, and where faeces also come out in the chamber between the cutting knife and the sucking mandrel, whereby bacteria from the cutting mandrel can very easily be transferred to the meat in the separation area between the outside of the intestine and the surrounding meat. Moreover, with the system whereby the sucking-up of the mixed liquid and faeces in one and the same chamber, there is no possibility of being able to re-circulate the liquid which is used in connection with the establishing of a cleaned area during the cutting.

The object of the present invention is thus to provide a system whereby it is possible to cut the anus/rectum area free, while at the same time that an emptying of the outermost part of the intestine is effected without any contamination of the meat by colon bacteria from the faeces, in that there are separate discharge openings for faeces and the disinfection liquid, whereby as further advantage it can be mentioned that the disinfection liquid can be re-circulated, in that it can be sent to a chamber for cleaning and thus be reused during the process.

This object is achieved with a system of the kind disclosed in the introduction, and where the apparatus further comprises first means for handling/removal/sucking-out of a disinfecting substance supplied to the cavity, said first means being separated from the means for establishing of a second under-pressure and comprising an arrangement for the establishing of a first under-pressure in the cavity.

The system functions in such a manner that the cutting arrangement, which is preferably configured as a hollow cylinder, is provided with a sharp edge at its end. This cylinder is mounted in a rotary/pivotal manner in a housing, and thus has a surface corresponding to approx. 4–5 cm which lies outside the housing itself. During the cutting free of the anus/rectum, the arrangement will be moved forward with its cutting edge which is placed between the outer membrane of the anus/rectum and the surrounding connective tissue. A rotation of the cylinder is effected, by which process the anus/rectum is cut free. At the same time, an under-pressure is established in a mandrel lying on the inside of the cutting arrangement and corresponding preferably to 0.9 atm. There is hereby effected an emptying of the outermost 10–20 cm which, incidentally, results in a collapse of the intestine.

In connection with the implementation of this rotation, cutting-free and establishing of vacuum, a disinfection liquid is injected under high pressure through a nozzle, for example lactic acid, which finds its way into a cylindrical passage between the mandrel and the cylinder itself and the extension of same.

In the cylindrical passage there is established an under-pressure which will suck the used, liquid disinfectant out. It should be noted that the first and second means which establish the respective under-pressures are separate and physically divided units which suck from each of their corresponding cavities, which are similarly separated from each other.

Since a vacuum is continued to be applied, no filling of the anus/rectum with disinfection liquid will occur, and that meat which is subsequently cut out will thus be bacteria free, also free of colon bacteria. In addition to the meat not being contaminated, there is also the side-effect that the cylinder knife is disinfected, so that no cross-contamination occurs from one slaughtered animal to the next.

Disinfection liquid is thus present during the whole of the sucking-out and emptying of the anus/rectum, and the whole process of emptying and cutting free of the anus/rectum is thus effected as contamination-free as possible due to the presence of the disinfecting liquid. The disinfecting liquid has a certain period of effect, depending on which type is used. This period can be as much as 20 seconds, which means that there is no risk during the subsequent handling at the next station that bacteria will be transferred to the relevant personnel when the slaughtered animal is conveyed to the station, where there is typically carried out a final closing of the anus/rectum, possibly by tying this in a knot, in that the area is very close to being one hundred percent disinfected. Consequently, it is important that the disinfecting liquid distributes itself on the inner surface which demarcates the cavity and also the surface of the mandrel, so that the system, during both the emptying and loosening of the anus/rectum, has the disinfecting liquid present on its inside and on its inner surface, whereby a disinfection of the anus/rectum is effected, and whereby there is also a disinfection of the knife itself. The disinfection is thus on the inside of the cylindrical drill, which is in contact with the outer surface of the intestine.

By providing an apparatus according to the invention, there is achieved an expedient supply and dosing of the substance which is necessary to attain the disinfection effect.

By providing an apparatus according to the invention, expedient relationships between the knife and the remaining part of the apparatus are achieved.

The invention also concerns a method for loosening the anus/rectum of a slaughtered animal, comprising the cutting free by means of a cutting arrangement of the outermost part of the anus/rectum in relation to the surrounding tissue, and where an under-pressure is established in a mandrel or the like for the sucking-up of faeces and the like from the anus/rectum, said mandrel being moved down in the anus/rectum, and where the knife/drill is fed forward for the cutting free, and where a liquid disinfectant is supplied to the cavity in the cutting arrangement, in which cavity the mandrel is disposed, and where the liquid leaves the cavity via discharge openings/systems which are separated from the faeces, said liquid not being in contact with the sucked-up faeces.

In the same manner as with the arrangement, with this method it is achieved that the risk of contamination of the meat is minimised, while at the same time an expedient disinfection of the knife itself is effected. The method is suitable for use in connection with the apparatus of the invention.

Finally, the invention also concerns the use of both the apparatus and the method for slaughtered animals.

Figure 2:
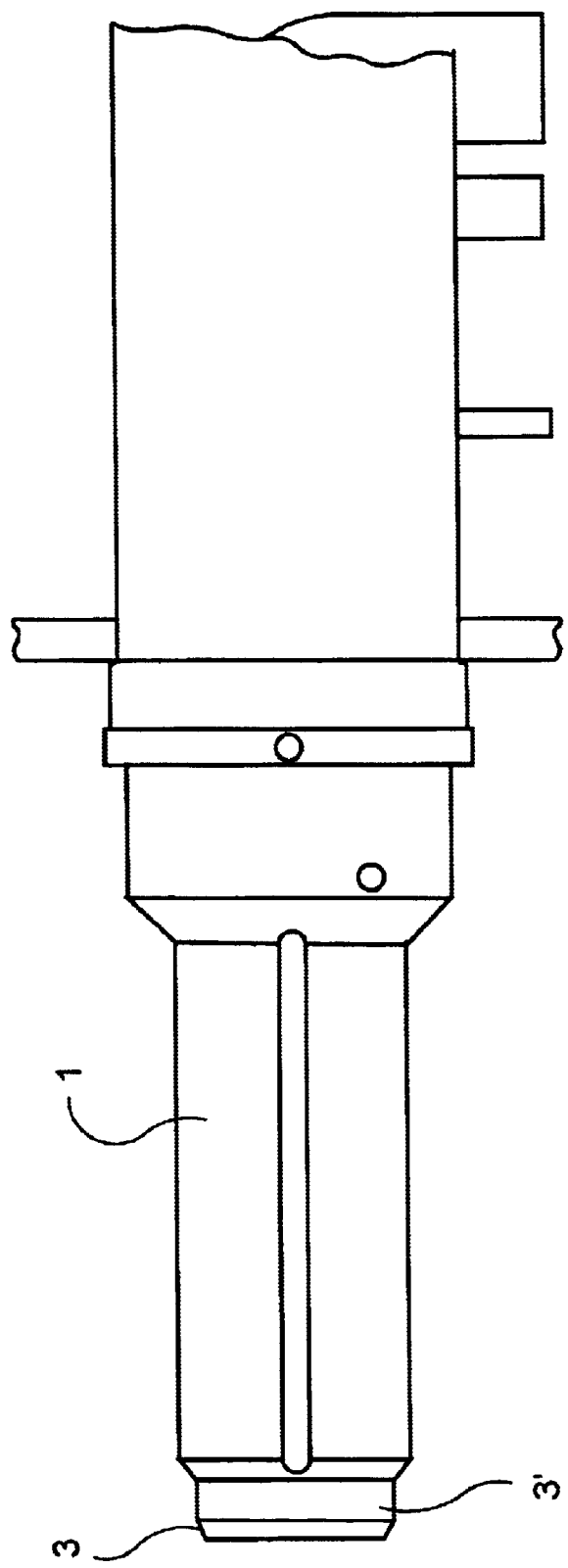
Figure 3:
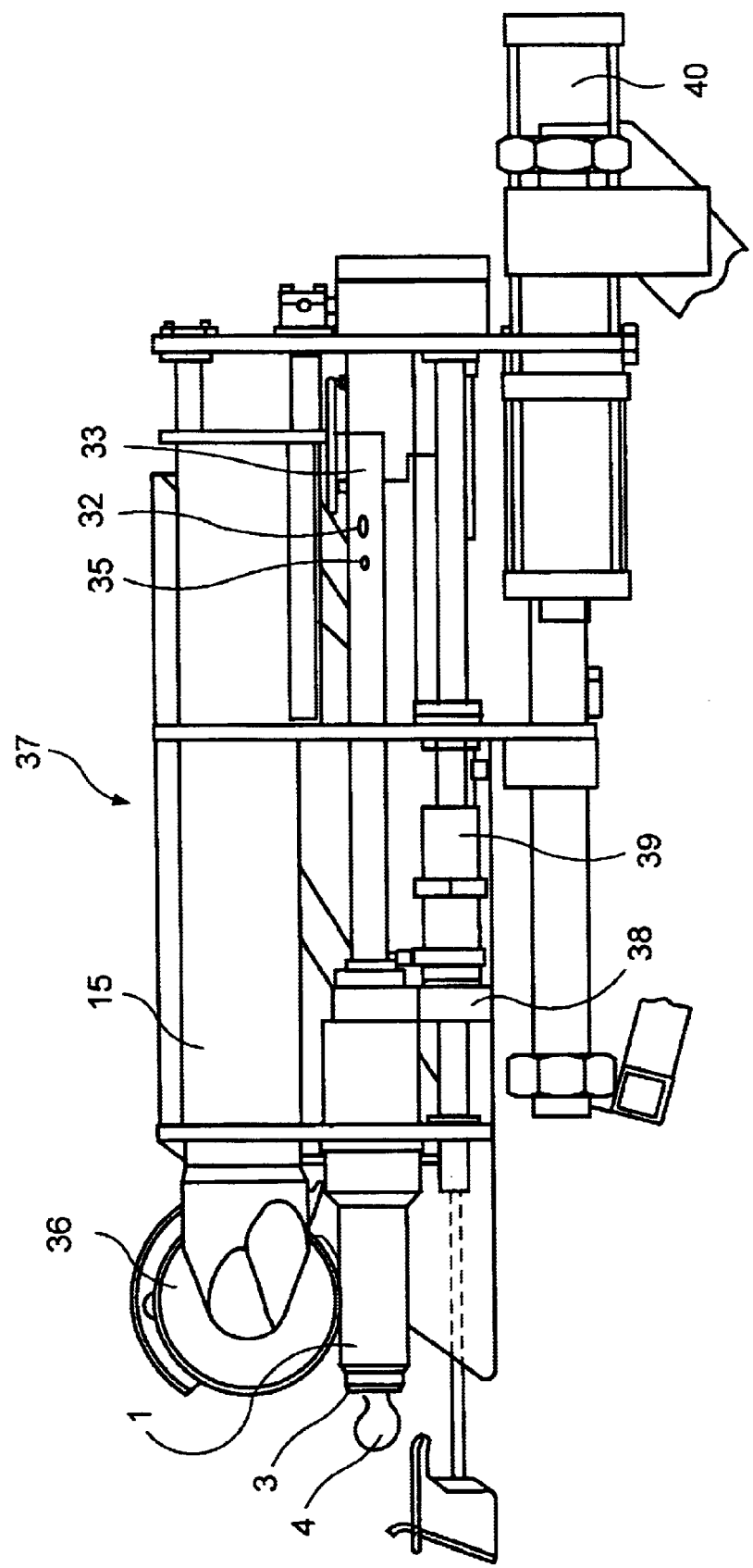
Figures 4, 5:
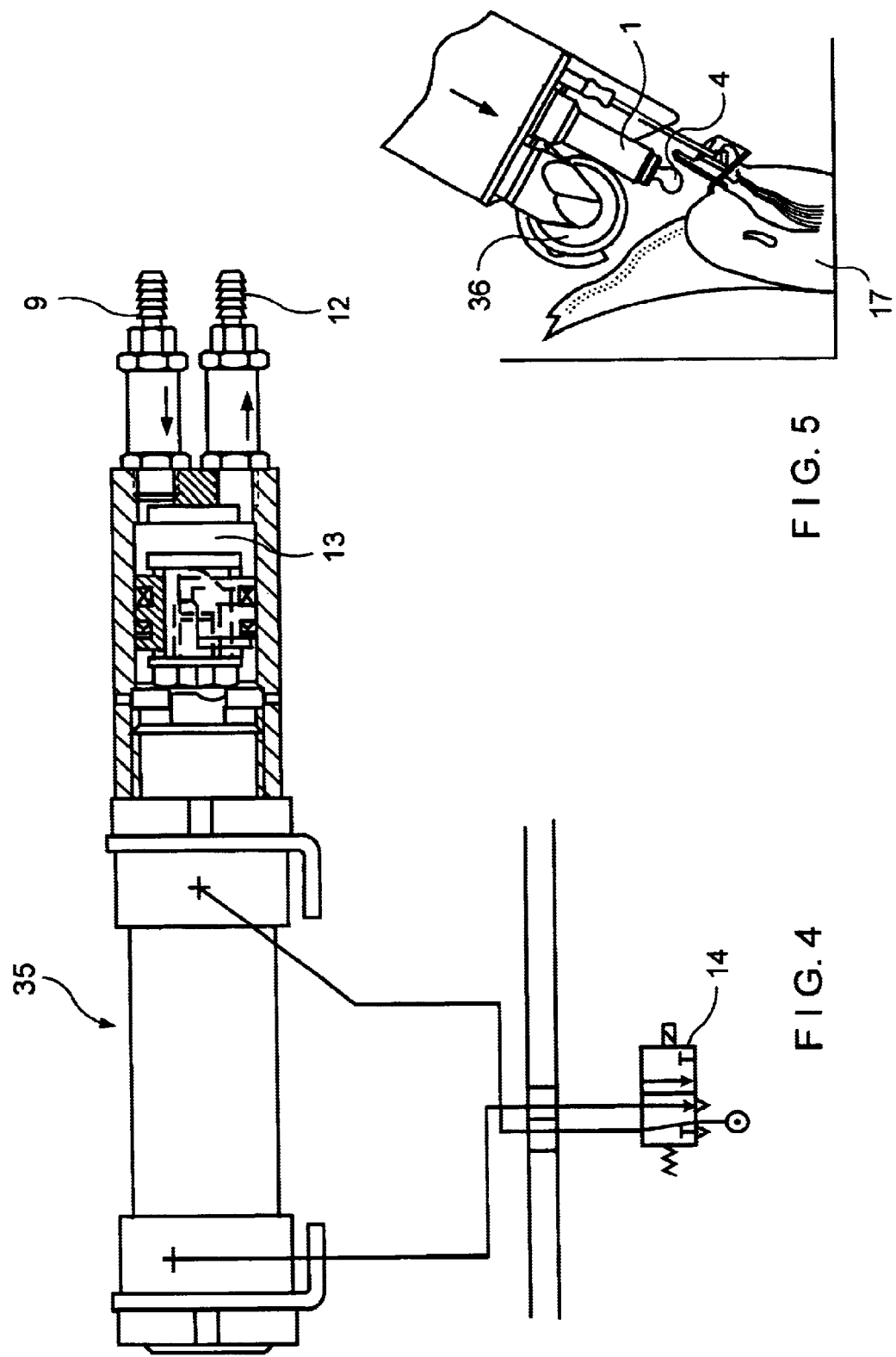

The invention will now be explained in more detail with reference to the drawing, where FIG. 1 shows a cross-section of the apparatus according to the invention, FIG. 2 shows the apparatus seen from the side, FIG. 3 shows an overall view of the apparatus comprising moving means, auxiliary systems and injection system, FIG. 4 shows the apparatus for injection of the liquid disinfectant, FIG. 5 shows the apparatus in relation to the hind quarters of a slaughtered pig and the positioning of the source of vacuum.

FIG. 1 shows a cross-section of a system in which is seen a cylindrical housing 1 which is stationary, in which cylinder a second cylinder 2 is disposed, and where there is a cavity 6 between the housing/cylinder 1 and the outer surface 21 of the cylinder 2 and the cutting edge. Cylinder 2 or an extension, cylinder 3', extends out of the cylinder 1 and terminates with a sharp cutting edge 3. Cylinder 2 or merely the cylinder part 3' in extension of and in connection with the cylinder 2 is mounted in cylinder 1 in a manner in which it can rotate, and the cylinder thus functions by being placed inside the anus so that the cutting edge 3 cuts down between the outer membrane surface of the intestine and the connective tissue surrounding the anus. Hereafter, the cylinder 3' and/or 2 is rotated whereby a loosening is effected. The cutting edge enters the animal approx. 4–5 cm. Before and during this cutting process, a vacuum is established, this being effected by a mechanism in the form of a mandrel 30 or a second cylindrical rod which is also seen indicated in FIG. 5. In that end which faces towards the intestine, the mandrel 30 is mounted with a ball-head 4 which, during the emptying of the intestine, has contact with the intestine. A vacuum of about 90% is established, i.e. an under-pressure of 0.9 atm. With this process, there is effected an emptying of the outermost 10–20 cm, and the intestine collapses. The vacuum is established through a vacuum tube 32 by second means comprising a pump 32' which is connected to the ma at the end opposite the ball-head 4.

In connection with the implementation of the cutting, a liquid disinfectant is now injected into the apparatus shown in FIG. 1. This injection of a liquid disinfectant which, for example, can be lactic acid, takes place through a nozzle 31. The amount typically injected is about 15–20 mm$^3$. This liquid thus spreads into the cavity 20 between the mandrel 30 and the cylinder 2.

In the outermost end of the possibly stationary tube 2 and the rotating tube 3' there is passage to the cavity 6, in that the inner tube 3' is provided with holes 7 around its circumference, said holes having a diameter of 2–5 mm, and where there is room for between 2 to 4, possibly more, evenly distributed around the circumference. The holes are covered by the housing 1, and a cooling liquid is drawn through the holes, in that water is injected through a nozzle 5, and due to the under-pressure in the cavity 20, the water is drawn in through the drill/cutter 3 which is hereby cooled.

The under-pressure in the cavity 20 is established through a vacuum tube 33 by first means comprising a pump 33' which is connected to the cavity 20 in the apparatus at that end which lies opposite the drill/cutter 3. The under-pressure is in the order of approx. 0.9 bar.

As a result of the vacuum/under-pressure being maintained in the cavity 20 at the same time that the emptying of the faeces is effected, the liquid disinfectant, after having been injected under high pressure 4–5 bar, will be sucked out via an opening 34. As a consequence of the high pressure and the rotation of the drill, it is ensured that the wall towards the cavity 20 is flushed before the sucking-out takes place. It should be noted that this rotating part 3' can be mounted in a rotary manner on a second inner cylinder 2, which can thus possibly be stationary in relation to the rotating cylinder 3' and stationary in the same manner as the outer cylinder 1.

In other words, liquid disinfectant is thus present during the whole of the suction and emptying of the rectum, and the whole process of emptying and loosening of the rectum is hereby effected as contamination-free as possible due to the presence of the liquid disinfectant. The liquid disinfectant is effective for a certain period, depending on which type is used. This period can be right up to 20 seconds. The pig is subsequently conveyed to the next workstation, where a possible final closing of the rectum takes place, possibly by this being tied in a knot.

FIG. 2 shows the arrangement seen from the outside, where the stationary housing 1 and a part of the rotating cylinder 3' lies outside the housing 1. The cutter 3 is preferably configured as a facet. The cylinder part distinguishes itself by being able to be displaced further outwards corresponding to about 4–5 cm, which is the depth at which it is required to work. It will appear from FIG. 3 how this translative movement can be effected, in that connected to cylinder 3' it is displaced forwards by means of a plunger or the like.

FIG. 3 shows the whole of the system 37, where the ball-head 4 is that part which is displaced forward, and through which the vacuum is established whereby the emptying of the intestine takes place. The apparatus according to the invention is connected to an auxiliary apparatus 15. This comprises a rotating saw blade 36 which subsequently carries out a cutting-up of the belly of the slaughtered animal when the processing of the anus/rectum has been brought to an end. A motor 39 drives a belt 38 which rotates the tube 2 (FIG. 1) and the cutter 3. When cutting is carried out with the cutter 3, the whole of the unit 37 is moved forwards and backwards by means of the cylinder 40. The mandrel 30, not shown in FIG. 3, which is a part of the vacuum tube 32, which in turn is a part of the vacuum tube 33, is moved forwards and backwards through the rotating parts 1 and 3 by an extended portion of the mandrel 30 (the mandrel does not rotate).

In FIG. 4 is seen the actual injection element 35 for the liquid disinfectant, this comprising a discharge opening 12 through which the liquid disinfectant leaves a chamber 13. Above the discharge opening 12 there is an inlet valve 9 which is connected to a hose through which the liquid disinfectant, preferably a lactic acid, is fed into the chamber for injection. The actual injection is effected by means of a control system 14 of an electronic character. The amount typically injected is in the order of 15–20 mm³.

FIG. 5 shows the relationships between the slaughtered animal and the apparatus itself comprising the ball-head 4, which is positioned centrally in the cylinder/cutter which effects the cutting, in that said cylinder part can be displaced and rotated in relation to the stationary housing 1. The slaughtered animals, which are mainly pigs 17, are positioned in relation to the arrangement, and thus there are control means which ensure that the ball-head 4 engages with the insides of the anus/rectum, after which the vacuum/ under-pressure is applied at the same time that the cutting part rotates and is fed forwards corresponding to 3–4 cm. The actual emptying, as discussed earlier, results in the emptying of 15–20 cm of the intestine. Concurrently herewith, an injection of the liquid disinfectant is carried out, which results in the disinfection of both the connective tissue surrounding the anus/rectum and the cutter itself.

The process steps are as follows:

When the pig is in position, the knife unit is moved into the start cutting position.

The knife unit is now moved at high speed to offset.

The movement of the knife unit continues at low speed, while at the same time the mandrel is fed forward and vacuum is applied to the mandrel.

When the mandrel is completely forward, the movement of the knife unit is stopped simultaneously with the starting of the rotation of the knife and drill, and the drill (knife unit) is moved towards the rectum/anus. Simultaneously with the forward movement of the knife, the return movement of the mandrel is started. The speed at which the mandrel returns must be the same as the speed at which the knife unit is fed forward.

When the drill has contact with the rectum/anus, vacuum is applied to the drill, i.e. the cavity 20, and immediately afterwards, corresponding to 20–25 mm of movement, lactic acid is dosed at a pressure of 4–5 bar.

When the drill (knife unit) is all the way forward (forward is a fixed distance in relation to the tail control), the rotation of the drill is stopped and at the same time the ham/pubis knife starts moving forward.

When the ham/pubis knife is forward, the rotation of the knife is stopped, while at the same time the ham/pubis knife and the knife unit move back, and vacuum is removed from the mandrel.

When the knife unit is back corresponding to the position in which the drill started to rotate, vacuum is removed from the mandrel in order to disengage from the rectum/anus.

Hereafter, the knife unit continues to the washing position.

When the washing position has been reached, the slide doors are closed and the washing is started.

External sluicing is effected with water at 82° C., while at the same time cold water is used to sluice between cylinder and drill and drill housing. Finally, external sluicing is carried out with cold water.

The invention is not restricted exclusively to said example embodiment.

What is claimed is:

1. Apparatus for the processing of an anus/rectum of a slaughtered animal comprising:

a cutting arrangement mounted in a housing for cutting a connection between the anus/rectum and surrounding tissue, said cutting arrangement having a cylindrical blade having a cutting edge, the cylindrical blade defining a cavity therein;

a hollow mandrel disposed in the cavity substantially coaxial with the cylindrical blade for receiving the anus/rectum and adjacent connective tissue thereover;

a first vacuum means connected to the hollow mandrel for emptying of a part of the anus/rectum therethrough;

means for supplying a disinfection substance to the cavity between the mandrel and an inner surface of the cylindrical blade for disinfecting the connecting tissue and cylindrical blade during processing; and, a second vacuum means connected to the cavity between the mandrel and the inner surface of the cylindrical blade for removing the disinfecting substance therefrom.

2. Apparatus according to claim 1 wherein the disinfection substance is a liquid injected into the cavity via an opening spaced away from the cutting edge.

3. Apparatus according to claim 1 wherein the second vacuum means is coupled to the cavity at an end of the housing opposite to the cutting edge.

4. Apparatus according to claim 1, wherein the means for supplying the disinfection substance is an injection element.

5. Apparatus according to claim 1, wherein the cutting arrangement is rotatably mounted in the housing.

* * * * *